Patented Apr. 12, 1932

1,853,278

UNITED STATES PATENT OFFICE

DANIEL JOSEPH KENNEDY, OF VANCOUVER, BRITISH COLUMBIA, CANADA

TREATMENT OF COFFEE

No Drawing.    Application filed June 12, 1928. Serial No. 284,884.

My invention relates to improvements in the treatment of coffee, the objects of which are to render it particularly beneficial as a beverage to invalids and others to whom coffee in its usual form is objectional or unduly stimulating. A further object is to change the caffeine of the coffee from a stimulating drug to a soothing sedative substance which imparts to the coffee a particularly pleasing taste and removes the stimulating effect which is so detrimental to highly nervous persons. A further object is to seal the pores of the coffee so that it will keep for lengthy periods without losing its flavour.

The invention consists essentially of coating the coffee either in berry or in granular form with chocolate or cocoa as will be more fully described in the following specification.

I have discovered that certain beneficial results are obtained by first steeping the green coffee berries in a dilute citric acid for approximately seventy two hours, which appears to loosen the caffeine in the berry whereby its conversion is accelerated in the ensuing process. While this process of steeping is desirable and advantageous, I do not look upon it as being essential to the general treatment of the coffee.

I take the green berry either in its natural form or after steeping in a dilute citric acid, and roast it until it changes colour and commences to exude moisture. I then add from 20 to 25 per cent by weight of cocoa or chocolate thereto and shake vigourously until the coffee is thoroughly coated or creamed with the cocoa bean product and by so doing prevent the white caffeine precipitate from escaping from the coffee.

The coffee and its coating ingredient is then subjected to a further roasting, which causes a chemical change to take place through the combining of the volatile oils of the two ingredients, this change in effect transforms the caffeine from a stimulating drug to a soothing substance or converting it from an alkaloid to a soluble salt. The cocoa or chocolate seals the pores of the coffee so that its aroma is preserved to the fullest extent even after long exposure to the atmosphere.

When it is desired to pack and sell the coffee in granular form, the green coffee berry is given a preliminary roasting as above described and is then ground preferably while it is hot, the cocoa or chocolate is added thereto and the whole is agitated to thoroughly coat all the grains of the coffee. When this is done, the combined ingredients are further roasted until the desired colour is obtained, it is then allowed to cool ready for packing.

Should it be desired to produce a mixture in which the cocoa or chocolate flavour is fully pronounced, I take the treated coffee immediately following its removal from the roaster and subject it to a further cocoa or chocolate coating, thoroughly agitating it during a portion of its cooling period. The pores of the coffee become thoroughly sealed with cocoa or chocolate during the primary agitation, thus preventing the escape of the volatile oils and aroma containing matter therein, so that no deterioration of the coffee or loss of its aroma is evident even after lengthy exposure to the atmosphere, therefore the need for packing the roasted coffee (either in berry or granular form) in containers from which air has been exhausted, is unnecessary.

It will thus be seen that I have invented a process of treating coffee which when subjected to boiling, will produce a peculiarly delightful beverage, which is refreshing and soothing and is highly beneficial and nutritious to people in any state of health, and one in which all the elements considered by the medical profession as being harmful to nervous people are entirely absent.

What I claim as my invention is:

1. The process of treating coffee in the berry or in granular form which consists of partially roasting the coffee, mixing therewith a product of the cocoa bean such as cocoa or chocolate and of continuing the roasting of the coffee.

2. The process of treating coffee in the berry or granular form which consists of partially roasting the coffee, mixing therewith a product of the cocoa bean such as cocoa or chocolate, of continuing the roasting and of mixing the roasted ingredients with a further quantity of the products of the cocoa bean.

3. The process of treating coffee in the berry or granular form which consists of subjecting it to a citrous acid solution, of partially roasting it and mixing therewith ground cocoa, of continuing the roasting process and mixing the roasted ingredients with a further quantity of cocoa.

4. The process of treating coffee which consists of subjecting the green berry to a citric acid solution, roasting the coffee and coating it while hot with cocoa to seal the pores of the coffee and of further roasting the coffee to combine the volatile oils of the two ingredients.

Dated at Vancouver, B. C., this 4th day of June, 1928.

DANIEL JOSEPH KENNEDY.